United States Patent [19]

Hayashi

[11] Patent Number: 4,615,304

[45] Date of Patent: Oct. 7, 1986

[54] ARRANGEMENT OF BOILING LIQUID COOLING SYSTEM OF INTERNAL COMBUSTION ENGINE

[75] Inventor: Yoshimasa Hayashi, Kamakura, Japan

[73] Assignee: Nissan Motor Co., Ltd., Yokohama, Japan

[21] Appl. No.: 599,804

[22] Filed: Apr. 13, 1984

[30] Foreign Application Priority Data

Apr. 21, 1983 [JP] Japan .................... 58-69231

[51] Int. Cl.$^4$ .................................... F01P 3/22
[52] U.S. Cl. .................................... 123/41.21
[58] Field of Search .............. 123/41.11, 41.12, 41.2, 123/41.21, 41.24, 41.27, 41.44, 41.51–41.54; 340/59; 73/304 R

[56] References Cited

U.S. PATENT DOCUMENTS

| | | | |
|---|---|---|---|
| 1,792,520 | 2/1931 | Weineardt | 123/41.44 |
| 1,806,382 | 5/1931 | Barlow | 123/41.2 |
| 2,260,578 | 10/1941 | Murray | 293/55 |
| 2,288,514 | 6/1942 | Caroselli | 123/41.2 |
| 2,292,946 | 8/1942 | Karig | 123/41.08 |
| 3,082,753 | 3/1963 | Bullard | 123/41.24 |
| 4,367,699 | 1/1983 | Evans | 123/41.49 |

FOREIGN PATENT DOCUMENTS

| | | |
|---|---|---|
| 419029 | 11/1934 | United Kingdom . |
| 480461 | 2/1938 | United Kingdom . |
| 976049 | 11/1964 | United Kingdom . |
| 2060524A | 5/1981 | United Kingdom . |

*Primary Examiner*—William A. Cuchlinski, Jr.
*Attorney, Agent, or Firm*—Schwartz, Jeffery, Schwaab, Mack, Blumenthal & Evans

[57] ABSTRACT

An improved arrangement of boiling liquid cooling system of an internal combustion engine in an engine room of a wheeled motor vehicle is disclosed. The condenser is located at a lower portion of the engine room so that the inlet of the condenser is positioned lower than the coolant level in the coolant jacket of the engine.

8 Claims, 2 Drawing Figures

ARRANGEMENT OF BOILING LIQUID COOLING SYSTEM OF INTERNAL COMBUSTION ENGINE

BACKGROUND OF THE INVENTION

1. Field of the Invention

The present invention relates in general to a cooling system of an internal combustion engine, and particularly to a boiling liquid cooling system of the engine. More particularly, the present invention is concerned with an arrangement of the boiling liquid cooling system mounted in an engine room of a vehicle.

2. Description of the Prior Art

It has been proposed to cool internal combustion engine by using a boiling liquid cooling system (viz., an evaporative cooling system). As will become apparent as the description proceeds, this type cooling system basically features an arrangement wherein a liquefied coolant in the coolant jacket of the engine is permitted to boil and the gaseous coolant thus produced is passed out to an air-cooled heat exchanger or condenser, wherein the coolant is condensed or liquefied and then recirculated back into the coolant jacket of the engine. Due to the effective heat exchange carried out between the gaseous coolant in the condenser and the atmosphere, the cooling system exhibits a very high performance.

Because of the above-mentioned outstanding performance, it has been proposed to mount such a boiling liquid cooling system in a wheeled motor vehicle as engine cooling means. However, as such type of cooling systems have, for various reasons, not met with any commercial success, the layout or arrangement of such systems in an engine room has not been the subject of any substantial degree of consideration.

SUMMARY OF THE INVENTION

It is therefore an object of the present invention to provide an improved layout or arrangement of the boiling liquid cooling system in an engine room of the vehicle.

According to the present invention, there is provided, in a motor vehicle having an internal combustion engine mounted in an engine room thereof, a boiling liquid cooling system which comprises means defining in the engine proper a coolant jacket which contains therein a liquefied coolant leaving an unoccupied space at the upper portion thereof thereby to form a coolant level therein, a first conduit extending from the unoccupied space of the coolant jacket, a condenser having an inlet connected to the leading end of the first conduit and an outlet positioned lower than the inlet, the inlet being positioned lower than the coolant level in the coolant jacket, and a second conduit extending from the outlet of the condenser to the coolant jacket of the engine proper.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
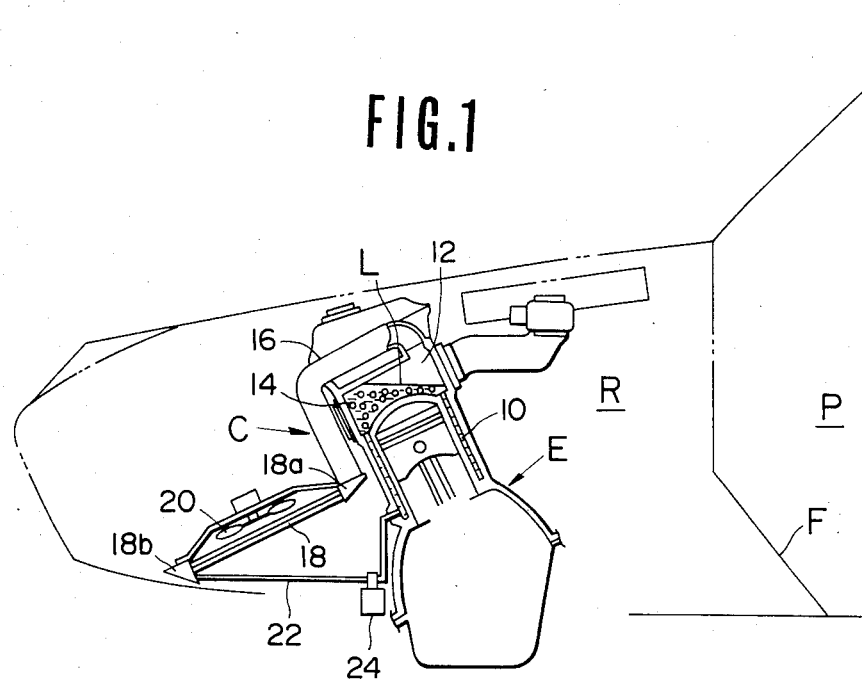
FIG. 1 is an illustration of a first embodiment of the present invention, showing an arrangement of boiling liquid cooling system of internal combustion engine mounted in an engine room of a wheeled motor vehicle.

Referring to FIG. 1, there is shown an arrangement of boiling liquid cooling system C of a first embodiment of the present invention. As is seen from the drawing, the engine E and the cooling system C are mounted in an engine room R of the vehicle body, and the engine E is arranged inclined forwardly with respect to the vehicle body. Designated by reference mark F is a fire board by which the engine room R and the passenger cabin P are bounded in a known manner.

The boiling liquid cooling system C of the first embodiment comprises a coolant jacket 10 formed in the engine proper E. The coolant jacket 10 has at its upper section an enlarged portion 12 merged therewith. The coolant jacket 10 contains therein a liquefied coolant 14 (for example, water), leaving an unoccupied space at the upper section of the enlarged portion 12. A generally L-shaped flexible tube 16 of relatively large diameter is connected to the enlarged jacket portion 12, which extends from the uppermost positioned outlet of the enlarged portion 12 and turns down and connects with an upper tank 18a of a condenser 18. Although not shown in the drawing, a vapor-liquid separator is operatively mounted in the outlet of the enlarged portion 12. In this first embodiment, the condenser 18 is positioned in front of the engine E. The condenser 18 is securely supported by a suitable rigid member (not shown) of the vehicle body and inclined with respect to the vehicle body. Preferably, the inclination angle of it relative to a horizontal member of the vehicle body is about 30 degrees. An electric fan 20 is mounted to the condenser 18, which produces an air flow passing through the condenser 18 when energized. Extending from a lower tank 18b of the condenser 18 is a pipe 22 of relatively small diameter which leads to a lower portion of the coolant jacket 10 of the engine proper E. An electric pump 24 is mounted to the pipe 22, which pumps up the liquefied coolant in the condenser lower tank 18b into the coolant jacket 10 when energized. It is to be noted that the upper tank 18b of the condenser 18 is positioned lower than the coolant level L in the enlarged jacket portion 12. Preferably, the upper tank 18a is positioned at a height equal to that of the vertically intermediate portion of the coolant jacket 10. This arrangement is employed due to the fact that the coolant supplied, to be cooled, to the condenser is a vapor which has excellent movability in every directions. Although not shown in the drawing, a known electric control means is associated with the electric pump 24 so that, under operation of the engine E, the pump 24 operates in a manner to keep the level L of the coolant 14 in the enlarged jacket portion 12 constant.

In operation, the coolant 14 in the coolant jacket 10 is permitted to boil and the gaseous coolant thus produced passes out through the tube 16 to the condenser 18 where the gaseous coolant is cooled and thus liquefied. The vapor-liquid separator (not shown) in the outlet of the coolant jacket 12 traps the liquid-state coolant and returns the same back to the jacket 12. During the condensation of the coolant in the condenser 18, the coolant removes a large amount of heat thereby allowing this cooling system to have a high cooling efficiency. Subsequent to the condensation, the liquefied coolant is recirculated back into the coolant jacket 10 of the engine E through the pipe 22 with an aid of the electric pump 24.

In order to show the excellent cooling efficiency of the above-mentioned cooling system C, the coolant flow rate required for achieving a sufficient cooling of the engine E will be considered with respect to a 1.8 liter gasoline type internal combustion engine under full throttle operation (viz., about 4000 rpm). Under this condition, the engine requires disposal of heat of about 400 Kcal/min. Thus, when water is used as the coolant, the required coolant flow rate is about 0.74 Kg/min which is calculated by the following equation.

Required coolant flow rate = 400 Kcal/min/540 Kcal/Kg (1)

wherein: 540 kcal/Kg is the evaporation latent heat of water.

This flow rate of 0.74 Kg/min (viz., 0.74 l/min) is quite small as compared with that (about 110 l/min) of the conventional liquid water-used cooling system. This excellent cooling efficiency of the system C brings about reduction in size of the condenser practically used in the system.

Figure 2:
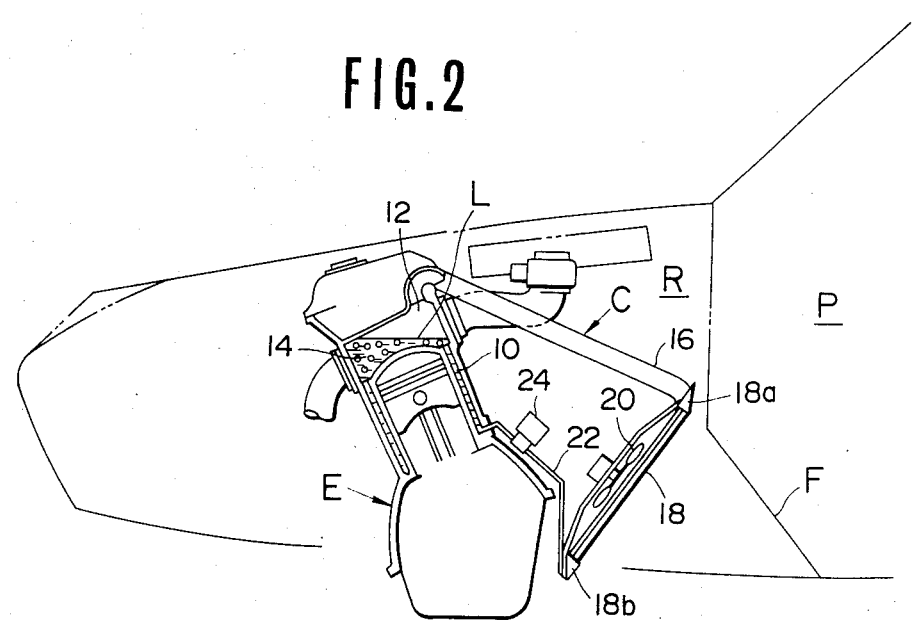
FIG. 2 is an illustration similar to FIG. 1, but showing a second embodiment of the present invention.

Referring to FIG. 2 of the drawings, there is shown a second embodiment of the present invention. In this second embodiment, the condenser 18 is positioned behind the engine E, that is, in the space between the engine E and the fire board F. Preferably, the condenser 18 is inclined about 60 degrees with respect to the horizontal member of the vehicle body. Also, in this second embodiment, the upper tank 18a of the condenser 18 is positioned lower than the coolant level L in the coolant jacket 10. The tube 16 used in this embodiment is a straight tube which extends from the outlet of the enlarged coolant jacket 12 obliquely downwardly to the upper tank 18a of the condenser 18.

In the following, advantageous features of the present invention will be described.

The inlet of the condenser 18 is positioned lower than the coolant level L in the coolant jacket 10 of the engine E. As is described hereinabove, this arrangement is permitted due to the excellent movability of coolant in gaseous state supplied to the condenser 18. Positioning the condenser 18 at the lower portions of the engine room as described in the first and second embodiments can reduce the thickness of the engine room thereby improving the external appearance of the vehicle. In addition to this, such positioning can bring about another advantage in that, under cruising of the vehicle, operation of the electric fan 22 becomes unnecessary because the lower portions of the engine room are well ventilated under cruising. Furthermore, in case of the second embodiment wherein the condenser 18 is positioned behind the engine E, the axial length of the engine room can be reduced thereby allowing the vehicle to have an elongated or enlarged passenger cabin. It is to be noted that the arrangement of positioning the condenser (viz., radiator) at the lower portion of the engine room can not be employed in the conventional water-used cooling system because of its inherency in construction. That is, in the conventional water-used cooling system, it is inevitably necessary to locate the inlet of the radiator (viz., condenser) at a position higher than the outlet of the water jacket of the engine in order not to form an air pocket in the water jacket.

What is claimed is:

1. In a motor vehicle having an internal combustion engine mounted in an engine room of a vehicle body, a boiling liquid cooling system associated with said engine for cooling the same by using a latent heat of coolant, which comprises:

means for defining in the engine proper a coolant jacket which contains therein a liquid coolant leaving an unoccupied space at the upper portion thereof thereby to form a liquid coolant level therein;

a first conduit extending from the unoccupied space of the coolant jacket;

a condenser having an inlet connected to the leading end of said first conduit and an outlet positioned lower than said inlet, said inlet being positioned lower than the coolant level in the coolant jacket;

a second conduit extending from the outlet of the condenser to said coolant jacket of the engine proper; and a cooling fan located in the vicinity of said condenser to produce, when energized, a flow of air which passes through said condenser;

wherein said condenser and said fan are inclined with respect to a horizontally arranged member of the vehicle so that the flow of air which has passed through said condenser fails to directly collide with the engine proper.

2. A boiling liquid cooling system as claimed in claim 1, in which said condenser is inclined approximately 30 degrees with respect to the horizontally arranged member and positioned in front of the engine proper.

3. A boiling liquid cooling system as claimed in claim 3, in which said first conduit is a generally L-shaped flexible tube which extends from the unoccupied space downward and turns down to connect with the inlet of the condenser.

4. A boiling liquid cooling system as claimed in claim 1, in which said condenser is inclined approximately 60 degrees with respect to the horizontally arranged member and positioned behind the engine proper.

5. A boiling liquid cooling system as claimed in claim 4, in which said first conduit is a straight tube which extends from the unoccupied space obliquely downwardly to the inlet of the condenser.

6. A boiling liquid cooling system as claimed in claim 1, further comprising an electric pump which is mounted to said second conduit to pump up the liquefied coolant in the condenser into said coolant jacket.

7. A boiling liquid cooling system as claimed in claim 1, wherein said fan is electric.

8. A boiling liquid cooling system for cooling an internal combustion engine for a motor vehicle by using a latent heat of cooling, comprising: means for defining in the engine proper a coolant jacket into which the coolant is introduced in a liquid state and from which the coolant is discharged in a gaseous state, said coolant jacket thereby containing coolant in a liquid state during engine operation and having an unoccupied space at the upper portion thereof thereby to form a coolant level therein;

a condenser having an inlet and an outlet, said outlet positioned lower than said inlet, said inlet being positioned lower than the coolant level in the coolant jacket;

a straight tube forming a first conduit extending obliquely downward from the unoccupied space of the coolant jacket and connected to the inlet of said condenser; and a second conduit extending from the outlet of the condenser to said coolant jacket of the engine proper;

wherein said condenser is inclined approximately 60 degrees with respect to a horizontally arranged member of said engine and is positioned behind the engine proper.

* * * * *